United States Patent
Feyereisen et al.

(10) Patent No.: US 7,471,214 B2
(45) Date of Patent: Dec. 30, 2008

(54) INTUITIVE WIND VELOCITY AND DIRECTION PRESENTATION

(75) Inventors: Thea L. Feyereisen, Hudson, WI (US); John M. Schmitt, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 194 days.

(21) Appl. No.: 11/249,698

(22) Filed: Oct. 13, 2005

(65) Prior Publication Data

US 2007/0085706 A1 Apr. 19, 2007

(51) Int. Cl.
*G08G 5/00* (2006.01)
(52) U.S. Cl. ............... 340/949; 340/945; 73/170.02; 701/14
(58) Field of Classification Search ......... 340/968, 340/949, 945; 701/14; 702/3; 73/170.01–170.03
See application file for complete search history.

(56) References Cited

U.S. PATENT DOCUMENTS

| | | | |
|---|---|---|---|
| 4,090,189 A | 5/1978 | Fisler | |
| 4,170,132 A * | 10/1979 | Serley | 73/178 T |
| 4,182,171 A * | 1/1980 | Looker | 73/178 R |
| 4,241,294 A | 12/1980 | Fisler | |
| 4,358,713 A | 11/1982 | Senoo et al. | |
| 4,514,727 A | 4/1985 | Van Antwerp | |
| 4,868,652 A | 9/1989 | Nutton | |
| 5,195,046 A | 3/1993 | Gerardi et al. | |
| 5,201,032 A | 4/1993 | Kurose | |
| 5,202,668 A | 4/1993 | Nagami | |
| 5,343,395 A | 8/1994 | Watts | |
| 5,426,727 A | 6/1995 | Sugiura et al. | |
| 5,745,095 A | 4/1998 | Parchem et al. | |
| 5,745,863 A | 4/1998 | Uhlenhop et al. | |
| 5,747,863 A | 5/1998 | Shoda | |
| 5,757,127 A | 5/1998 | Inoguchi et al. | |
| 5,825,308 A | 10/1998 | Rosenberg | |
| 6,057,856 A | 5/2000 | Miyashita et al. | |
| 6,066,046 A * | 5/2000 | Yamamoto | 463/7 |
| 6,166,744 A | 12/2000 | Jaszlics et al. | |
| 6,208,933 B1 | 3/2001 | Lazar | |
| 6,327,089 B1 | 12/2001 | Hosaki et al. | |
| 6,359,737 B1 | 3/2002 | Stringfellow | |
| 6,486,856 B1 | 11/2002 | Zink | |
| 6,496,760 B1 | 12/2002 | Michaelson et al. | |
| 6,504,518 B1 | 1/2003 | Kuwayama et al. | |
| 6,545,677 B2 | 4/2003 | Brown | |
| 6,545,803 B1 | 4/2003 | Sakuma et al. | |
| 6,570,559 B1 | 5/2003 | Oshima | |
| 6,570,581 B1 | 5/2003 | Smith | |
| 6,618,045 B1 | 9/2003 | Lin | |
| 6,636,277 B2 | 10/2003 | Eberhardt et al. | |
| 6,647,774 B1 * | 11/2003 | Youngquist | 73/170.02 |
| 6,650,340 B1 | 11/2003 | Georges et al. | |
| 6,678,588 B2 | 1/2004 | He | |

(Continued)

*Primary Examiner*—Jeff Hofsass
*Assistant Examiner*—Hongmin Fan
(74) *Attorney, Agent, or Firm*—Ingrassia Fisher & Lorenz, P.C.

(57) ABSTRACT

A method for displaying the direction of an external force relative to a craft is provided. The method comprises obtaining direction data for an external force, obtaining craft directional data, calculating the force's direction relative to the craft's direction, and displaying a graphical representation of the force's direction relative to the direction of the craft.

22 Claims, 4 Drawing Sheets

U.S. PATENT DOCUMENTS

| | | |
|---|---|---|
| 6,690,296 B2 | 2/2004 | Corwin et al. |
| 6,690,299 B1 | 2/2004 | Suiter |
| 6,690,351 B1 | 2/2004 | Wong |
| 6,700,482 B2 | 3/2004 | Ververs et al. |
| 6,703,945 B2 | 3/2004 | Kuntman et al. |
| 6,727,489 B2 | 4/2004 | Yano |
| 6,744,478 B1 | 6/2004 | Asakura et al. |
| 6,747,650 B2 | 6/2004 | Turner et al. |
| 6,762,801 B2 | 7/2004 | Weiss et al. |
| 6,917,860 B1 * | 7/2005 | Robinson et al. ............... 701/3 |
| 2002/0154061 A1 * | 10/2002 | Frazier et al. ............... 342/455 |
| 2002/0167536 A1 | 11/2002 | Valdes et al. |
| 2002/0171639 A1 | 11/2002 | Ben-David |
| 2003/0016236 A1 | 1/2003 | Bronson |
| 2003/0122810 A1 | 7/2003 | Tsirkel et al. |
| 2003/0193411 A1 | 10/2003 | Price |
| 2004/0201589 A1 | 10/2004 | Ekstrom |
| 2004/0201596 A1 | 10/2004 | Coldefy et al. |
| 2005/0007261 A1 | 1/2005 | Berson et al. |
| 2005/0007386 A1 | 1/2005 | Berson et al. |
| 2005/0090201 A1 * | 4/2005 | Lengies et al. ............. 455/41.2 |

* cited by examiner

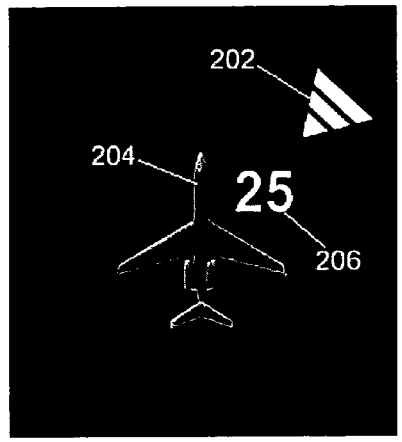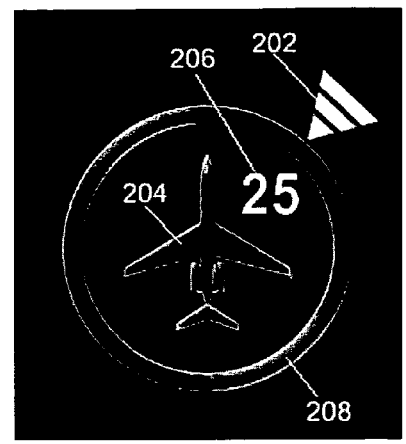
Figure 2A · Figure 2B
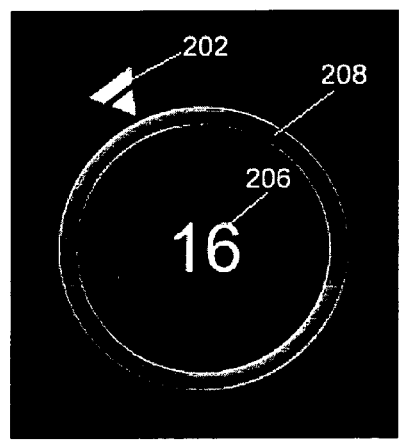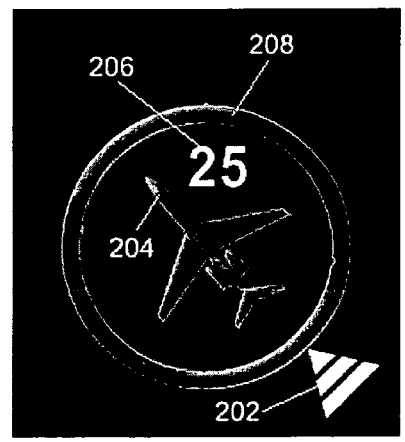
Figure 2C · Figure 2D

INTUITIVE WIND VELOCITY AND DIRECTION PRESENTATION

TECHNICAL FIELD

The present invention generally relates to graphical displays and, in particular, to an intuitive presentation of a force magnitude and direction.

BACKGROUND

For many vehicles and crafts, external forces can affect navigation of the craft. For example, wind affects aircraft, sailboats and cars while water current affects all types of boats. As navigation displays in these crafts have become more advanced, data on these forces along with other navigational data have been included in those displays. With time and advances in technology, the displays of navigational data have become more intuitive and effective.

However, current displays of external forces on crafts are still ambiguous as to the direction of the force relative to the craft's orientation. For example, although data regarding wind speed and direction may be available on an aircraft navigation display, it is not easy to discern the direction of the wind with regards to the aircraft's trajectory. This type of ambiguity can lead to confusion among operators of the different types of craft as to the direction of the external force with respect to their own crafts which makes navigation more difficult.

For the reasons stated above, and for other reasons stated below which will become apparent to those skilled in the art upon reading and understanding the present specification, there is a need in the art for an intuitive display of the direction and magnitude of external forces with respect to the orientation of a craft.

SUMMARY

Embodiments of the present invention solve the need for an intuitive display of the direction and magnitude of external forces with respect to a craft.

In one embodiment, a method for displaying the direction of an external force relative to a craft is provided. The method comprises obtaining direction data for an external force, obtaining craft directional data, calculating the force's direction relative to the craft's direction, and displaying a graphical representation of the force's direction relative to the direction of the craft.

In another embodiment, a graphical display system is provided. The graphical display system comprises one or more sensors which obtain craft directional data and data regarding magnitude and direction of an external force acting on a craft and at least one processor for receiving and processing data from the one or more sensors, wherein the at least one processor calculates the direction of the external force relative to the craft's direction. The graphical display system also comprises a display element for receiving signals from the at least one processor and displaying the direction of the external force relative to the craft's direction according to the signals from the at least one processor.

In yet another embodiment, a computer readable medium having computer-executable instructions for performing a method of displaying the direction of an external force relative to a craft. The method comprises obtaining directional data for an external force and for a craft, calculating the force's direction relative to the craft's direction, and displaying a symbol whose position on a display forms an angle with the craft's direction representing the external force's direction relative to the craft's direction.

In another embodiment, a graphical display system is provided. The graphical display system comprises means for obtaining data regarding a craft's direction, means for obtaining data regarding the magnitude and direction of an external force acting on the said craft, and means for displaying the direction of said external force relative to the craft.

DRAWINGS

FIG. 2A is an image of an intuitive display of an external force's direction according to one embodiment of the present invention.

FIG. 2B is an image of an intuitive display of an external force's direction according to one embodiment of the present invention.

FIG. 2C is an image of an intuitive display of an external force's direction according to one embodiment of the present invention.

FIG. 2D is an image of an intuitive display of an external force's direction according to one embodiment of the present invention.

DETAILED DESCRIPTION

Figure 1:
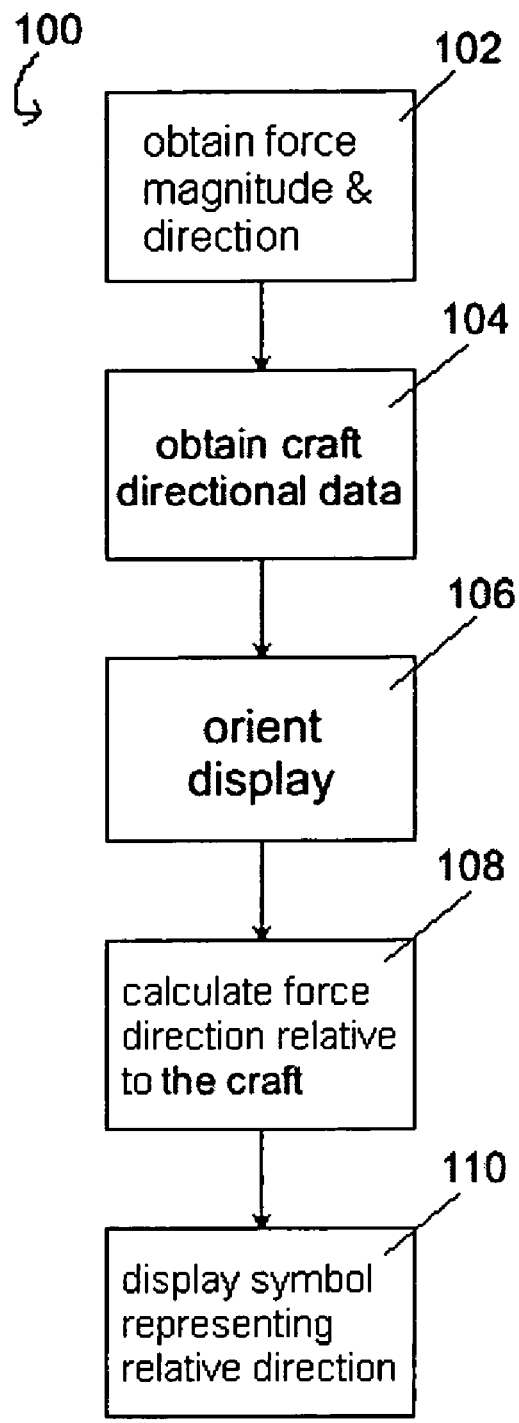
FIG. 1 is a flow chart showing a method for presenting an intuitive display of the direction of an external force relative to a craft.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. Furthermore, it will be understood by one of skill in the art that although the specific embodiments illustrated below are directed at aircraft for purposes of explanation, the method and apparatus may be used in various embodiments employing various types of crafts, such as space craft, automobiles, unmanned air vehicles (UAV), lunar landers and sea ships, etc. Moreover, embodiments of the present invention are suitable for use on CRT, LCD, plasma or any other existing or later developed display technology. It should also be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Although data regarding external forces, such as wind speed and direction, may be displayed on a navigation display, the data is not displayed relative to the craft's own direction. For example, a display may show that an aircraft has a north-north west heading and winds are coming from a southwest direction. The flight crew of the aircraft, however, has to convert the wind direction to understand the wind direction with respect to the aircraft's north-north west heading. While the calculations may only involve trigonometry, it is still relatively easy for members of the flight crew to be confused respecting the wind direction considering the many other tasks required of the flight crew. Embodiments of the present invention, however, make the calculations for the flight crew and display the wind direction relative to the aircraft in an intuitive and easy to understand manner. Hence, embodiments of the present invention alleviate potential confusion and allow flight crews to focus on other important aspects of flying.

FIG. 1 is a flow chart showing a method 100 for presenting an intuitive display of the direction of an external force relative to the orientation of a craft. In some embodiments involving multiple UAVs, a plurality of instances of method 100, one for each UAV being observed/controlled on a display element, are performed. Hence, in such embodiments, a plurality of graphical representations of the direction of an external force relative to the orientation of a craft are presented on a common display element, one for each UAV, as shown in an exemplary embodiment in FIG. 4. At 102, data is obtained regarding the magnitude and direction of an external force. In some embodiments concerning aircraft, this external force is wind speed and direction. At 104, craft directional data is obtained. In some embodiments, craft directional data is heading data. In other embodiments, craft directional data is track data. In yet other embodiments, craft directional data is a combination of both heading and track data. At 106, the display is oriented. In some embodiments implemented in aircraft, the display is oriented by aligning the direction of the aircraft with the top of the display. An exemplary embodiment of this orientation is shown in FIGS. 2A and 2B. Although exemplary embodiments shown in FIGS. 2A-2D are directed at aircraft, it will be understood by one of skill in the art that the features shown in FIGS. 2A-2D are also implemented in other embodiments directed at other types of crafts.

In FIGS. 2A and 2B, aircraft symbol 204 is pointing to the top of the display indicating the aircraft's direction. In some embodiments, the direction is based on the aircraft's heading. In other embodiments, the direction is based on the aircraft's track. In yet other embodiments, the direction is based on a combination of the aircraft's heading and track. In other embodiments, the orienting includes aligning the top of the display with North and displaying aircraft symbol 204 at the angle of its direction relative to North. An exemplary embodiment of this orientation is shown in FIG. 2D. In FIG. 2D, North is at the top of the display and aircraft symbol 204 is displayed at an angle representing the angle between North and the aircraft's direction.

At 108, the force's direction relative to a direction of the craft is calculated. In some embodiments, calculating the force direction relative to the craft's direction includes calculating an angle directly between the force's direction and the craft's direction. Exemplary embodiments of displays of this calculation with respect to aircrafts are shown in FIGS. 2A-2C. In other embodiments, calculating the force's direction in relation to the craft's direction includes calculating a first angle between North and the craft's direction, and calculating a second angle between North and the force's direction. The combination of the first and second angles represents the angle between the craft's direction and the force's direction. An exemplary embodiment of a display of this calculation implemented in an aircraft is shown in FIG. 2D. In some embodiments implemented in aircraft, the force direction is the direction of wind. In some such embodiments, the wind direction relative to an aircraft's heading is calculated. In other embodiments, the wind direction is calculated relative to an aircraft's track. In yet other embodiments, the wind direction is calculated relative to a combination of an aircraft's heading and track.

At 110, a graphical representation of the force's direction relative to the craft is displayed. Exemplary embodiments, involving aircraft, display wind direction relative to a direction of the aircraft in FIGS. 2A-2D. Although exemplary embodiments shown in FIGS. 2A-2D are directed at aircraft, it will be understood by one of skill in the art that the features shown in FIGS. 2A-2D are also implemented in other embodiments directed at other types of crafts. In some embodiments, force direction symbol 202 is a triangle pointing inwardly toward aircraft symbol 204. In other embodiments, other shapes are used. In some embodiments, as shown in FIG. 2B, ring 208 is included to aid in making the display easier to read. In other embodiments, as shown in FIG. 2A, ring 208 is not included. Additionally, in some embodiments, aircraft symbol 204 is not included, as shown in FIG. 2C. In such embodiments, force direction symbol 202 still points inward toward the center of the circle where aircraft symbol 204 is shown in other embodiments. Additionally, in such embodiments, ring 208 is typically included to aid in reading the display in the absence of aircraft symbol 204.

Some embodiments include magnitude indicator 206. Magnitude indicator 206 gives a digital display of the magnitude of the external force. In embodiments of the present invention implemented in aircraft, magnitude indicator 206 displays the wind speed. The magnitude of a force is displayed in any appropriate measurement system including the metric and British systems. In yet other embodiments, magnitude indicator 206 is not included. Additionally, in some embodiments, the magnitude of the force is displayed by scaling the size of force direction symbol 202. In some embodiments, the length of force direction symbol 202 is scaled to indicate magnitude, as shown in FIG. 2C. In other embodiments, the width of force direction symbol 202 is scaled. In some embodiments, force direction symbol 202 has a maximum and minimum size. In other embodiments, the color of force direction symbol changes indicating the magnitude of the force. As can be seen in FIGS. 2A-2D, all embodiments of the present invention alleviate the confusion of determining force direction with respect to the direction of a craft.

Figure 3:
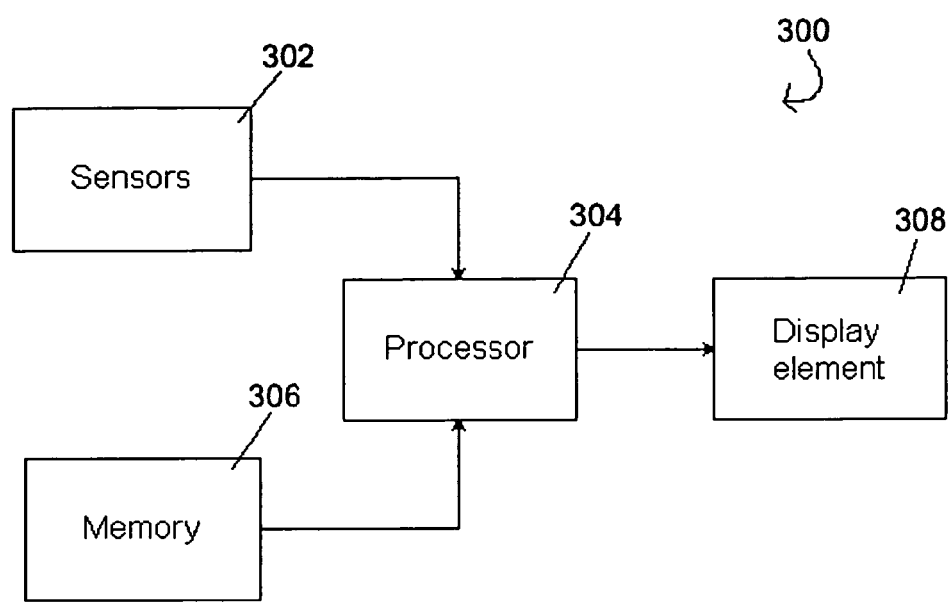
FIG. 3 is a block diagram of a graphical display system according to one embodiment of the present invention.

FIG. 3 is a block diagram of a graphical display system according to one embodiment of the present invention. In FIG. 3, an exemplary graphical display system 300 includes processor 304 configured to provide data for display to display element 308. One or more data sources are coupled to processor 304. These data sources include, but are not limited to, sensors 302 and memory 306. In some embodiments, one or more of these data sources are omitted. In some embodiments, sensors 302 are used to provide data to processor 304 for use by processor 304 in calculating wind direction relative to an aircraft. Sensors 302 include any appropriate sensor for determining a craft's position and direction as well as the magnitude and direction of an external force. Such sensors include, but are not limited to, anemometers, ultrasonic sensors, coherent Doppler laser radar, global positioning system (GPS) receivers, pressure gauges, etc. In some embodiments, one or more of sensors 302 are located on a craft. In other embodiments, one or more of sensors 302 are located in a remote location and data is transmitted to a craft via wireless telecommunication techniques known to one of skill in the art. In other embodiments, one or more of sensors 302 are located on a craft and data collected by sensors 302 is transmitted to processor 304, located in a remote site, via wireless telecommunication techniques.

Memory 306 includes any type of suitable medium such as floppy disks, conventional hard disks, CD-ROM, flash memory ROM, nonvolatile ROM, RAM, or other suitable medium. Processor 304 and memory 306 are coupled together allowing processor 304 to write to and store data in memory 306 as well as retrieve stored data from memory 306. In one embodiment, memory 306 stores data received by processor 304 from sensors 302. In some embodiments, memory 306 temporarily stores data to be transmitted from processor 304 to display element 308.

Processor 304 includes or interfaces with hardware components that support the graphics display system. By way of example and not by way of limitation, these hardware components include one or more microprocessors, graphics processors, memories, storage devices, interface cards, and other standard components known in the art. Additionally, processor 304 includes or functions with software programs, firmware or computer readable instructions for carrying out various methods, process tasks, calculations, control functions, and the generation of display signals and other data used in the operation of the display system. These instructions are typically stored on any appropriate medium used for storage of computer readable instructions such as floppy disks, conventional hard disks, CD-ROM, flash ROM, nonvolatile ROM, RAM, and other like medium. In some embodiments, these instructions are stored on memory 306.

Display element 308 includes any display element suitable for displaying the various symbols and information for the operation of embodiments of the present invention including existing and later developed display technology. There are many known display elements that are suitable for these tasks, such as various CRT, active matrix LCD, passive matrix LCD, and plasma displays. Embodiments of the present invention are implemented in both heads-up and heads-down displays. Processor 304 sends appropriate signals and data to display element 308. These signals and data instruct display element 308 to display force direction relative to a craft's direction. In some embodiments, a display of the force direction relative to a craft's direction is overlaid on top of other graphics displayed on display element 308. In some such embodiments, the display of the force direction relative to a craft's direction is semi-transparent allowing background graphics to be seen.

Figure 4:
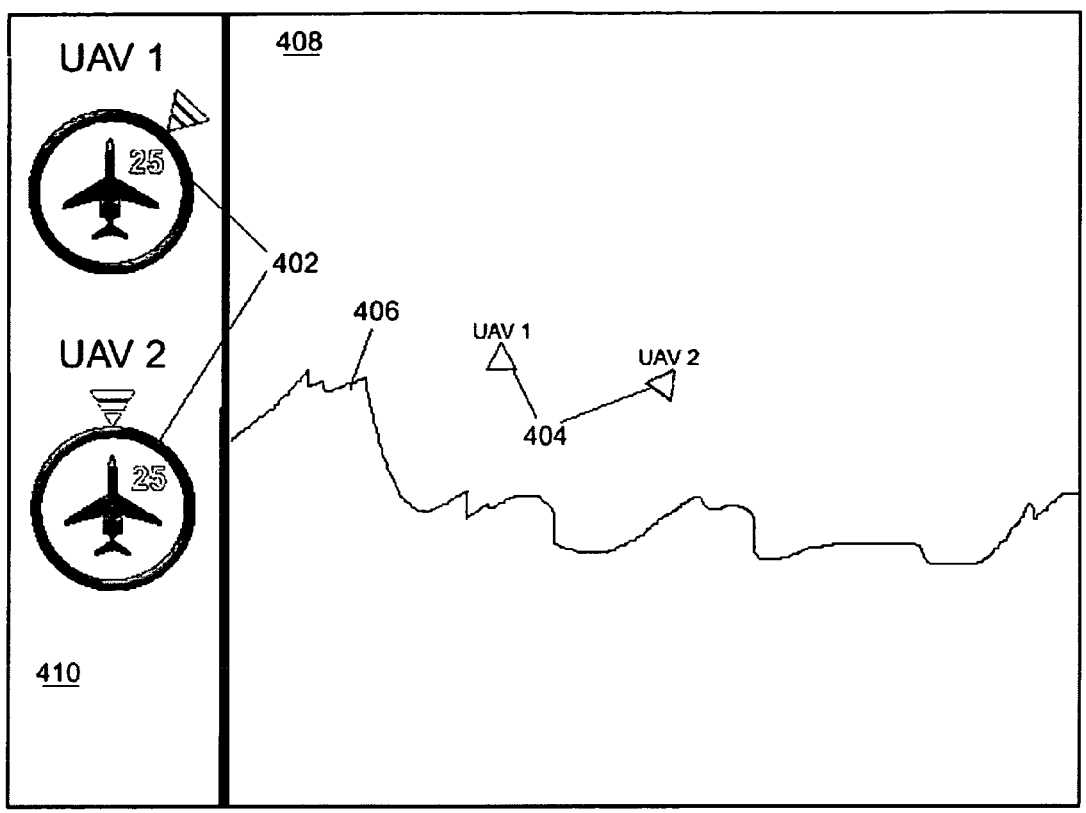
FIG. 4 is an image of a display of a plurality of graphical representations of the direction of an external force relative to a plurality of crafts according to one embodiment of the present invention.

FIG. 4 is an image of a display of a plurality of graphical representations of the direction of an external force relative to a plurality of crafts according to one embodiment of the present invention. As depicted in FIG. 4, a plurality of craft symbols 404, each symbol representing an UAV, is displayed in section 408 with graphical terrain 406. In section 410, graphical force representations 402 are displayed. Each of graphical force representations corresponds to one of craft symbols 404. In other embodiments, graphical force representations 402 are displayed at different positions and in different sizes. For example, in one embodiment graphical force representations 402 are displayed next to craft symbols 404. Additionally, although only two craft symbols 404 and two graphical force representations 402 are displayed in FIG. 4, it will be understood by one of skill in the art that in other embodiments, other appropriate numbers of symbols and force representations are used, one force representation for each symbol.

Although specific embodiments have been illustrated and described herein, it will be appreciated by those of ordinary skill in the art that any arrangement, which is calculated to achieve the same purpose, may be substituted for the specific embodiment shown. For example, although the specific embodiments illustrated are directed at aircraft, the method and apparatus may be used in various embodiments employing various types of crafts, such as space craft, automobiles, UAVs, lunar landers, and sea ships, etc. This application is intended to cover any adaptations or variations of the present invention. Therefore, it is manifestly intended that this invention be limited only by the claims and the equivalents thereof.

What is claimed is:

1. A method for displaying the direction of an external force relative to a plurality of craft, the method comprising:
   obtaining direction data for the external force;
   obtaining craft directional data for the plurality of craft being observed on a common display element;
   calculating a force's direction relative to the direction of each of the plurality of craft; and
   displaying a plurality of graphical representations on the common display element, wherein each of the plurality of graphical representations corresponds to the force's direction relative to the direction of a respective craft.

2. The method of claim 1, wherein obtaining direction data for an external force comprises: obtaining direction data for wind.

3. The method of claim 1, wherein obtaining craft directional data comprises: obtaining heading data for a first craft of the plurality of craft.

4. The method of claim 1, wherein displaying a plurality of graphical representations comprises: displaying, for a first craft of the plurality of craft, a symbol whose location on the display forms an angle with the first craft's direction representing the angle between the direction of the first craft and the direction of the force.

5. The method of claim 4, wherein displaying a symbol includes: changing the symbol's color to indicate the force's magnitude.

6. The method of claim 4, wherein displaying a symbol includes: scaling the symbol's size to indicate the force's magnitude.

7. The method of claim 4, wherein displaying a symbol includes: displaying a triangle pointing inward toward a center point, wherein the triangle rotates about the center point to indicate changes in the force's direction, the center point representing the center point of the first craft.

8. The method of claim 7 further comprising: displaying a ring around the center point, the triangle rotating about the ring.

9. The method of claim 1, further comprising: orienting a display for displaying a graphical representation of the force direction relative to the direction of a first craft of the plurality of craft.

10. The method of claim 9, wherein: orienting a display comprises aligning the direction of the first craft with the top of the display; and calculating the force's direction relative to the first craft's direction comprises calculating an angle directly between the force's direction and the first craft's direction.

11. The method of claim 9, wherein: orienting a display comprises aligning the top of the display with North and displaying a graphic of the first craft to indicate the first craft's direction relative to North; and calculating the force's direction relative to the first craft's direction comprises calculating a first angle between North and the first craft's direction and a second angle between North and the force's direction such that the first and second angles combine to form the angle representing the angle between the first craft's direction and the direction of the force.

12. A graphical display system comprising:

one or more sensors which obtain craft directional data and data regarding magnitude and direction of an external force acting on a plurality of craft;

at least one processor for receiving and processing data from the one or more sensors, wherein the at least one processor calculates the direction of the external force relative to the direction of each of the plurality of craft; and a display element for receiving signals from the at least one processor and displaying a plurality of graphical representations of the direction of the external force relative to each of the plurality of craft according to the signals from the at least one processor, wherein each of the plurality of graphical representations corresponds to the force's direction relative to a respective craft.

13. The graphical display system of claim 12, wherein: the at least one processor orients a display on the display element by aligning the direction of the craft with the top of the display.

14. The graphical display system of claim 12, wherein: the display element displays a symbol for a first craft of the plurality of craft, the location of which forms an angle with the direction of the first craft representing the direction of the external force relative to the first craft's direction, wherein the symbol rotates in a circular path about a center point to indicate changes in the force's direction, the center point representing the center point of the first craft.

15. The graphical display system of claim 14, wherein: the display element scales the symbol's size, according to signals from the at least one processor, to indicate the magnitude of the external force.

16. A computer readable medium having computer-executable instructions for performing a method of displaying the direction of an external force relative to a plurality of craft, the method comprising:

obtaining directional data for an external force and for the plurality of craft being observed on a common display element;

calculating a force's direction relative to the direction of each of the plurality of craft; and displaying a plurality of symbols whose positions on the display element each forms an angle with a respective craft's direction representing the external force's direction relative to the respective craft's direction.

17. The computer readable medium of claim 16, wherein displaying a symbol includes: scaling the symbol's size to indicate the force's magnitude.

18. The computer readable medium of claim 16, further comprising: orienting a display.

19. The computer readable medium of claim 18, wherein orienting a display comprises: aligning the top of the display with a combination of the craft's heading and track for a first craft of the plurality of craft.

20. The computer readable medium of claim 18, wherein: orienting a display comprises aligning the top of the display with North; and displaying a symbol includes displaying a graphic of the first craft at a first angle between North and the first craft's direction and displaying a different graphic at a second angle between North and the force's direction such that the first and second angles combine to form an angle representing the angle between the first craft's direction and the direction of the force.

21. A graphical display system comprising:

means for obtaining craft directional data for a plurality of craft being observed on a common display element;

means for obtaining data regarding the magnitude and direction of an external force acting on the said craft;

means for calculating the magnitude and direction of said external force acting on said craft relative to each craft's direction; and means for displaying a plurality of graphical representations on the common display element, wherein each of the plurality of graphical representations corresponds to the force's direction relative to each craft's direction.

22. The graphical display system of claim 21, wherein means for displaying include: means for displaying a symbol which rotates in a circular path about a center point, the center point representing the center of a first craft of the plurality of craft and wherein the angle formed by the symbol and the first craft's direction represents the angle between the direction of the external force and the first craft's direction.

* * * * *